United States Patent
Romzek et al.

(10) Patent No.: US 6,508,237 B2
(45) Date of Patent: Jan. 21, 2003

(54) EXHAUST GAS RECIRCULATION TRANSIENT SMOKE CONTROL

(75) Inventors: Martin A. Romzek, Dearborn, MI (US); Richard Marcis, Novi, MI (US)

(73) Assignee: Detroit Diesel Corporation, Detroit, MI (US)

(*) Notice: Subject to any disclaimer, the term of this patent is extended or adjusted under 35 U.S.C. 154(b) by 0 days.

(21) Appl. No.: 09/772,023

(22) Filed: Jan. 29, 2001

(65) Prior Publication Data

US 2002/0100460 A1 Aug. 1, 2002

(51) Int. Cl.$^7$ .............................................. F02M 25/07
(52) U.S. Cl. .................. 123/568.21; 60/605.2
(58) Field of Search ...................... 123/568.21; 60/605.2

(56) References Cited

U.S. PATENT DOCUMENTS

| | | | |
|---|---|---|---|
| 4,147,141 A | 4/1979 | Nagano | |
| 5,201,303 A | 4/1993 | Kojima | |
| 5,617,726 A | 4/1997 | Sheridan et al. | |
| 5,732,688 A | 3/1998 | Charlton et al. | |
| 6,016,788 A | * 1/2000 | Kibe et al. | 123/568.21 |
| 6,029,451 A | 2/2000 | Gartner | |
| 6,112,729 A | * 9/2000 | Barnes et al. | 123/568.21 |
| 6,142,119 A | * 11/2000 | Abe et al. | 123/568.21 |
| 6,148,616 A | 11/2000 | Yoshida et al. | |
| 6,155,240 A | 12/2000 | Amano | |
| 6,209,530 B1 | * 4/2001 | Faletti et al. | 123/568.21 |
| 6,227,182 B1 | * 5/2001 | Muraki et al. | 123/568.21 |
| 6,244,256 B1 | 6/2001 | Wall et al. | |
| 6,247,446 B1 | 6/2001 | Fassler et al. | |
| 6,247,462 B1 | 6/2001 | Wild et al. | |
| 6,305,167 B1 | 10/2001 | Weismann, II et al. | |
| 6,321,732 B1 | * 11/2001 | Kotuicki et al. | 123/568.21 |

* cited by examiner

Primary Examiner—Paul J. Hirsch
(74) Attorney, Agent, or Firm—Brooks & Kushman P.C.

(57) ABSTRACT

A method for controlling an internal combustion engine having an EGR circuit including an exhaust gas recirculation valve for diverting exhaust gas from an engine exhaust to an engine intake includes ascertaining a predefined threshold based on at least one engine operating condition and preventing the EGR valve from opening if the at least one engine operating condition is below the predefined threshold to reduce or eliminate visible black smoke which may occur during transient conditions. In one embodiment, the engine operating condition represents EGR boost pressure.

23 Claims, 4 Drawing Sheets

EXHAUST GAS RECIRCULATION TRANSIENT SMOKE CONTROL

TECHNICAL FIELD

The present invention relates to systems and methods for controlling exhaust smoke produced by an internal combustion engine.

BACKGROUND ART

In an effort to reduce exhaust gas emissions, many internal combustion engines incorporate an exhaust gas recirculation (EGR) circuit. The exhaust gas recirculation circuit typically includes an EGR valve which diverts engine exhaust gases from the engine exhaust manifold to the engine intake manifold. This portion of the engine exhaust gas is mixed with clean air and fuel before entering the engine's combustion cylinders to lower combustion temperature and reduce certain exhaust gas emissions.

For engines using EGR during transient conditions, boost levels may drop below a desired value for EGR control. This results in poor air/fuel ratio and periods of visible black exhaust smoke. Prior art systems and methods have implemented feed forward control to limit this effect. While feed forward control has reduced the visible black exhaust smoke, the problem has not been eliminated.

Therefore, a need exists for a system and method for managing the EGR circuit under transient conditions to significantly reduce or eliminate visible black exhaust smoke.

DISCLOSURE OF INVENTION

In accordance with an aspect of the present invention, a method for controlling an internal combustion engine having an EGR circuit is provided. The EGR circuit has an exhaust gas recirculation valve for diverting exhaust gas from an engine exhaust to an engine intake. The method includes ascertaining a predefined threshold based on at least one engine operating condition and preventing the EGR valve from opening if the at least one engine operating condition is below the predefined threshold.

In accordance with another aspect of the present invention the at least one operating condition is current EGR boost pressure.

In accordance with another aspect of the present invention the predefined threshold is a function of engine speed and engine load.

In accordance with another aspect of the present invention the method further comprises accessing a look-up table having a predefined threshold stored therein.

In accordance with another aspect of the present invention, the method includes determining whether EGR gas is flowing.

In accordance with another aspect of the present invention, the method includes sensing a current engine speed.

In accordance with another aspect of the present invention, the method includes determining a current engine load.

In accordance with yet another aspect of the present invention, a computer readable storage medium is provided having instructions stored thereon that are executable by a controller to perform a method of controlling an internal combustion engine, the engine including a variable geometry turbocharger (VGT) and an exhaust gas recirculation (EGR) system. The EGR system includes an EGR valve. The medium has instructions for ascertaining a predefined threshold based on at least one engine operating condition and instructions for preventing the EGR valve from opening if the at least one engine operating condition is below the predefined threshold.

The above features, benefits and advantages and other features, benefits and advantages of the present invention are readily apparent from the following detailed description of the best mode for carrying out the invention when taken together with the accompanying drawings.

BEST MODE FOR CARRYING OUT THE INVENTION

Figure 1:
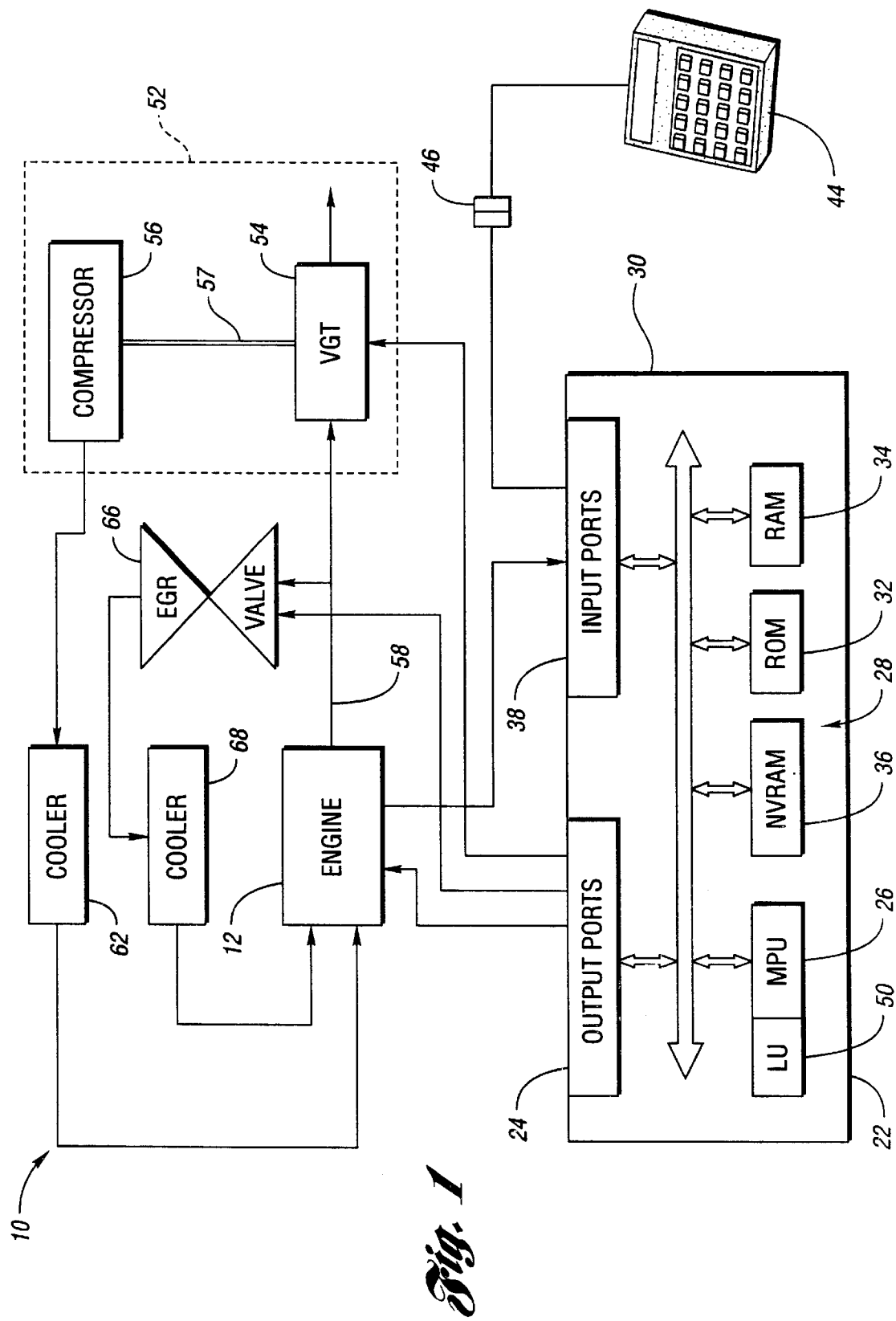
FIG. 1 is a schematic diagram of an internal combustion engine and engine control system made in accordance with an embodiment of the present invention.

With reference to FIG. 1, an internal combustion engine and associated control systems and subsystems are generally indicated at 10. System 10 includes an engine 12 having a plurality of cylinders, each fed by a fuel injector. In a preferred embodiment, engine 12 is a compression-ignition internal combustion engine, such as a heavy duty diesel engine. The injectors receive pressurized fuel from a fuel supply in a known manner.

Various sensors are in electrical communication with a controller 22 via input ports 24. Controller 22 preferably includes a microprocessor 26 in communication with various computer readable storage media 28 via data and control bus 30. Computer readable storage media 28 may include any of a number of known devices which function as read only memory 32, random access memory 34, and nonvolatile random access memory 36.

Computer readable storage media 28 have instructions stored thereon that are executable by controller 22 to perform methods of controlling the internal combustion engine, including variable flow exhaust gas recirculation (EGR) valve 66 and variable geometry turbocharger 52. The program instructions direct controller 22 to control the various systems and subsystems of the vehicle, with the instructions being executed by microprocessor 26, and optionally, instructions may also be executed by any number of logic units 50. Input ports 24 receive signals from various sensors, and controller 22 generates signals at output ports 38 that are directed to the various vehicle components.

A data, diagnostics, and programming interface 44 may also be selectively connected to controller 22 via a plug 46 to exchange various information therebetween. Interface 44 may be used to change values within the computer readable storage media 28, such as configuration settings, calibration variables, instructions for EGR and VGT control and others.

In operation, controller 22 receives signals from the various vehicle sensors and executes control logic embedded in hardware and/or software to control the engine. In a preferred embodiment, controller 22 is the DDEC controller available from Detroit Diesel Corporation, Detroit, Michigan. Various other features of this controller are described in detail in a number of different U.S. patents assigned to Detroit Diesel Corporation.

As is appreciated by one of ordinary skill in the art, control logic may be implemented in hardware, firmware, software, or combinations thereof. Control logic may be executed by controller 22, in addition to by any of the various systems and subsystems of the vehicle cooperating with controller 22. Although in a preferred embodiment, controller 22 includes microprocessor 26, any of a number of known programming and processing techniques or strategy may be used to control an engine in accordance with the present invention. The engine controller may receive information in a variety of ways. For example, engine systems information could be received over a data link, at a digital input or at a sensor input of the engine controller.

With continuing reference to FIG. 1, controller 22 provides enhanced engine performance by controlling a variable flow exhaust gas recirculation valve 66 and a variable geometry turbocharger 52. Variable geometry turbocharger 52 includes a turbine 54 and a compressor 56. The pressure of the engine exhaust gasses causes the turbine to spin. The turbine drives the compressor, which is typically mounted on the same shaft 57. The spinning compressor creates turbo boost pressure which develops increased power during combustion.

A variable geometry turbocharger has moveable components in addition to the rotor group. These moveable components can change the turbocharger geometry by changing the area or areas in the turbine stage through which exhaust gasses from the engine flow, and/or changing the angle at which the exhaust gasses enter or leave the turbine. Depending upon the turbocharger geometry, the turbocharger supplies varying amounts of turbo boost pressure to the engine. The variable geometry turbocharger may be electronically controlled to vary the amount of turbo boost pressure based on various operating conditions.

In a variable geometry turbocharger, the turbine housing is oversized for an engine, and the air flow is choked down to the desired level. There are several designs for the variable geometry turbocharger. In one design, a variable inlet nozzle has a cascade of moveable vanes which are pivotable to change the area and angle at which the air flow enters the turbine wheel. In another design, the turbocharger has a moveable side wall which varies the effective cross-sectional area of the turbine housing. Embodiments of the present invention are not limited to any particular structure for the variable geometry turbocharger. That is, the term VGT as used herein means any controllable air pressurizing device including the above examples, and including a modulated waste gate valve.

An exhaust gas recirculation system introduces a metered portion of the exhaust gasses into the intake manifold 69. The EGR system dilutes the incoming fuel charge and lowers combustion temperatures to reduce the level of oxides of nitrogen. The amount of exhaust gas to be recirculated is controlled by EGR valve 66 and VGT 52. In accordance with the present invention, the EGR valve is a variable flow valve that is electronically controlled by controller 22. The geometry of the variable geometry turbocharger is also electronically controlled by controller 22. There are many possible configurations for a controllable EGR valve, and embodiments of the present invention are not limited to any particular structure for the EGR valve. Further, it is appreciated that various sensors at the EGR valve may detect temperature and differential pressure to allow the engine control to determine the mass flow rate through the valve. In addition, various different sensor configurations may be utilized in various parts of the exhaust flow paths to allow controller 22 to determine the various mass flow rates throughout the exhaust system, including flow through the EGR system, flow through the compressor, and any other flows.

In some embodiments, it may be desirable to provide a cooler 62 to cool the charge air coming from compressor 56. Similarly, in some embodiments, it may be desirable to provide a cooler 68 to cool the flow through the EGR system prior to reintroduction into engine 12.

Embodiments of the present invention include control logic that processes various inputs representing various engine conditions, and in turn, provides an EGR command signal and a VGT command signal. The EGR command signal commands a position for the variable flow EGR valve 66 to control gas flow through path 64, while the VGT command signal commands a geometry for VGT 52 to control gas flow through path 60. In a preferred embodiment of the present invention, the various techniques utilized to determine the EGR and VGT command signals are best shown in FIG. 2.

Figure 2A:
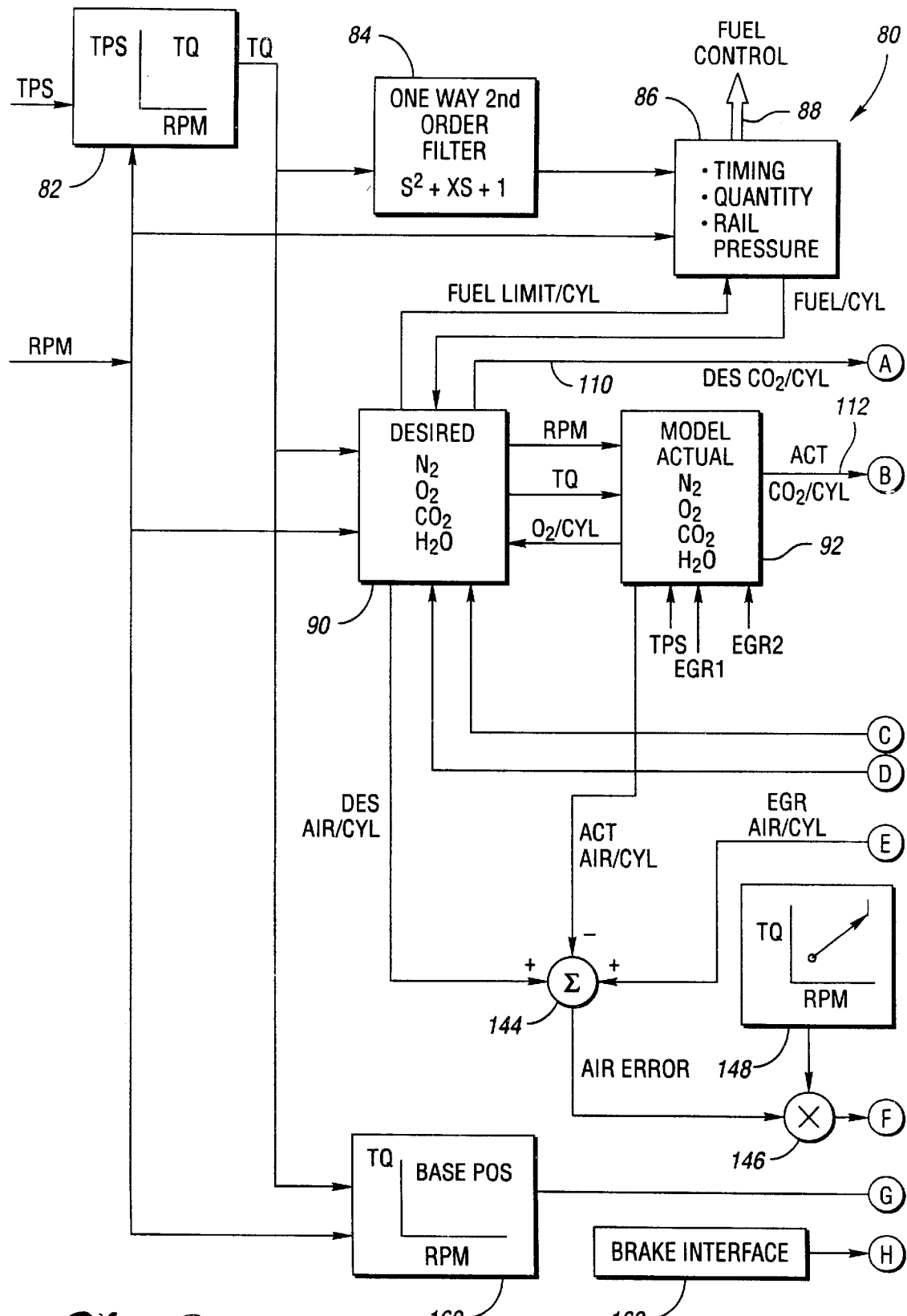
FIG. 2($a+b$) is a block diagram of a control logic for controlling the EGR and VGT circuits, in accordance with the present invention.
Figure 2B:
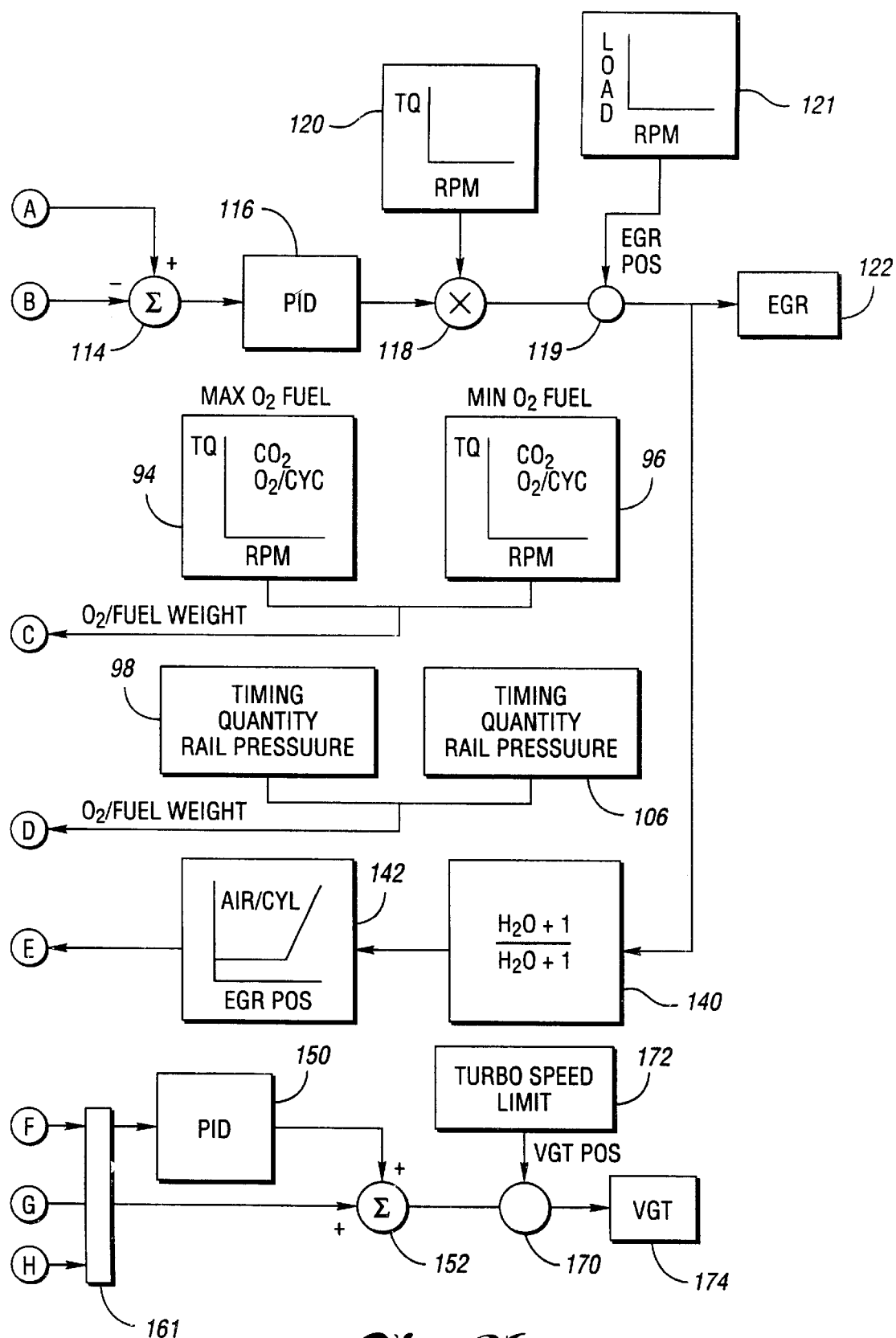

In FIG. 2, a block diagram 80 illustrates the functions of the control logic, including instructions, executed by controller 22 to provide enhanced engine performance and improved emission control. Embodiments of the present invention are particularly useful to improve emissions on heavy-duty diesel engines. Using EGR technology to mix a portion of exhaust gas with the intake charge reduces emissions of oxides of nitrogen ($NO_x$), while minimizing fuel economy impact and improving durability, in accordance with the present invention. In a turbocharged diesel engine, the back pressure necessary to drive the EGR flow from exhaust to intake manifold is accomplished with the variable geometry turbocharger. The control of the EGR flow rate may be achieved by changing the geometry of the VGT (for example, vane position change), by changing the EGR valve position, and preferably via a combination. In preferred embodiments, the method of control employed results in interactions between EGR and VGT systems that are beyond the capabilities of existing systems.

There are many aspects of the present invention that may be used separately or together. In the preferred embodiment, the EGR valve and the VGT are controlled simultaneously and continuously. That is, preferred embodiments provide a continuously adjusting EGR/VGT controller. Preferred implementations of the present invention utilize desired intake manifold composition in terms of chemical species ($O_2$, $N_2$, $CO_2$ and $H_2O$) as a set point for the controller. The actual quantity of these chemical species is preferably calculated from a simplified combustion model.

With continuing reference to FIG. 2, in the embodiment illustrated, a driver accelerator position sensor input and an engine speed (rpm) input are received at block 82. Block 82 utilizes a look up table to determine an engine torque demand. The engine torque demand represents a fuel quantity that may be adjusted for other aspects of engine control that are not specifically described herein such as, for example, cylinder balancing. Further, it is appreciated that FIG. 2 illustrates a preferred implementation and that various aspects of the control strategy shown are preferred, but not specifically required. At block 84, a one way, second order filter adds some delay to the torque demand. Delay is added to allow the slower, air flow aspects of engine control to catch up to the faster responding torque demand aspects of engine control. At block 86, engine speed and filtered torque demand are received, and processed along with other engine conditions, resulting in desired fuel injection timing, quantity, and rail pressure. These factors control fuel delivery, indicated at 88.

At block 90, a desired chemical composition for the engine air intake is determined. The desired composition is in terms of chemical species ($N_2$, $O_2$, $CO_2$, and $H_2O$). The fuel per cycle is provided to block 90 from injection control block 86, and block 90 provides a fuel limit per cycle to block 86 (for example, fuel may be limited in low air flow conditions). At block 92, actual flow values for the EGR system and turbo charging system, the oxygen to fuel ratio, and chemical composition of the intake gasses are calculated. The calculations are based on a simplified combustion model and engine sensor inputs. The desired or set point values in block 90 are based on interpolation of values contained within five pairs of look up tables. The first table (94,98) corresponds to stabilized turbocharger boost pressure and the second table (96,100) corresponds to zero turbocharger boost pressure. That is, the first table corresponds to maximum oxygen per fuel (per cycle) while the second table corresponds to minimum oxygen per fuel. Depending on the current oxygen per fuel as determined from various measurements, desired values are interpolated between the two tables for the particular value.

For example, desired carbon dioxide and air values are determined with an interpolation between tables 94,96 (block 94 and block 96 each represent two look up tables, one table for $CO_2$ and one table for oxygen quantity/cycle, for a total of four tables). Similarly, desired values for timing parameters, quantity, and rail pressure are determined by interpolation (based on oxygen per fuel) between tables 98 and 100 (block 98 and block 100 each represent three tables). In accordance with preferred embodiments of the present invention, controller 22 adjusts VGT and EGR operation to achieve the desired values at block 90 (that are calculated by interpolation) within the respective minimum/maximum tables (96,100 and 94,98, respectively).

Further at block 90, a desired carbon dioxide quantity 110 is determined. From block 92, an actual carbon dioxide quantity is estimated. The quantities are preferably represented as mass per cycle. Summer 114 compares the desired carbon dioxide quantity 110 to the actual carbon dioxide quantity 112 to determine the carbon dioxide error signal. EGR valve 122 is controlled by an EGR command signal based on the error signal. Preferably, a controller, such as a proportional/integral/derivative controller 116 (or preferably with a non linear compensation term, for example, a Smith predictor) adjusts the EGR valve position to achieve a desired EGR rate and desired carbon dioxide quantity. Further, in preferred embodiments, EGR loop gain normalization is contained within block 120 to improve transient response by reducing the effects of rapid changes in torque demand.

Figure 3:
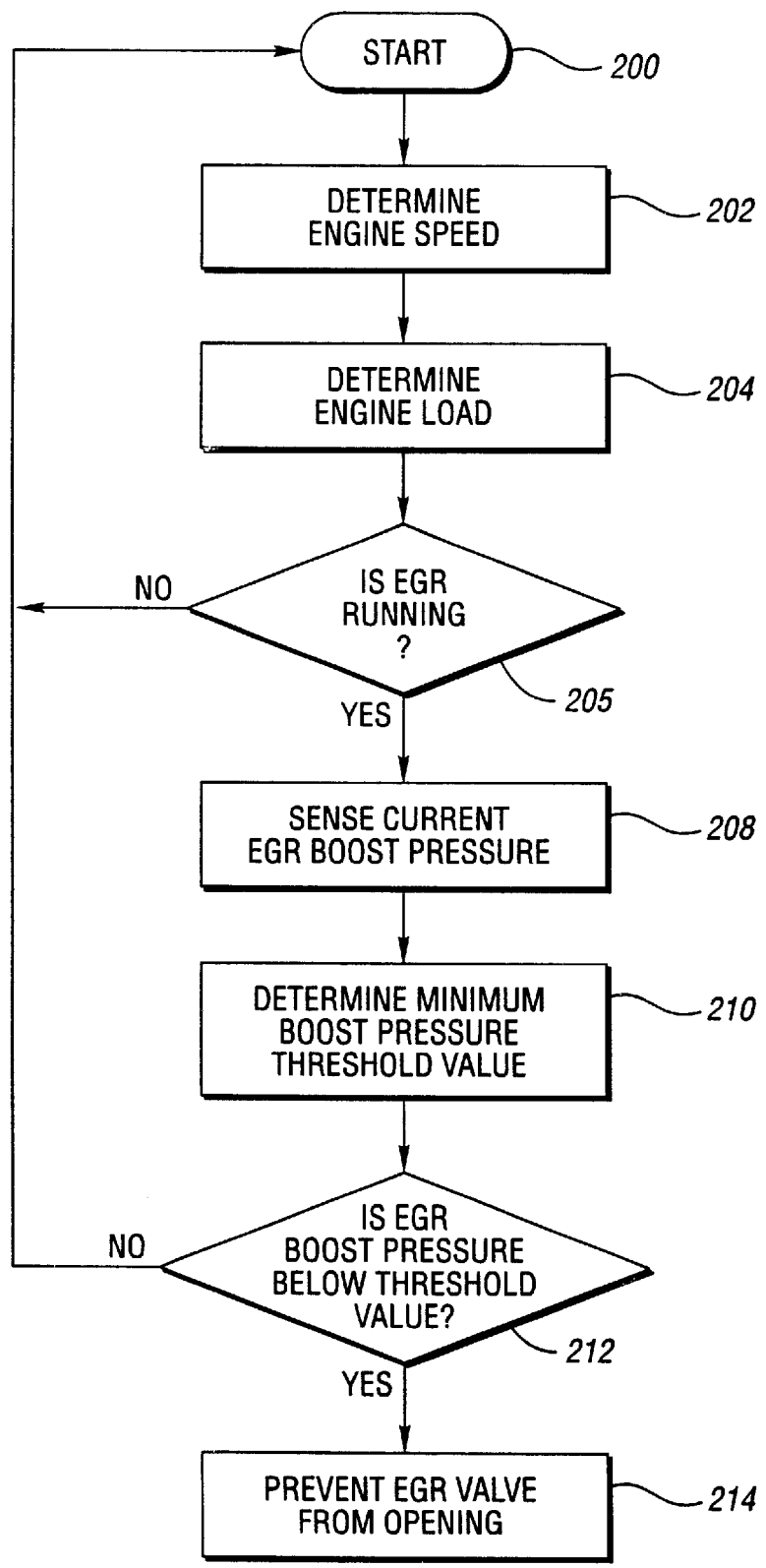
FIG. 3 is a flowchart illustrating a method for controlling engine exhaust smoke, in accordance of the present invention.

After loop gain normalization, limiter 119 restricts the EGR command signal as needed to prevent excessive exhaust smoke during transient engine operation, as described in further detail in FIG. 3. The resultant EGR command signal is supplied by controller 22 (FIG. 1) to EGR valve 122. Preferably, the EGR command signal is also passed to the VGT control, as described below.

In controlling VGT 174, a base geometry (vane position in the preferred implementation), is determined at block 160 based on torque demand and engine speed. The commanded base position is passed from block 160 to block 161. At block 162, a brake interface allows engine braking control logic to override a commanded base position by the normal VGT logic in the event that the engine is being operated as an engine brake. Engine braking uses the engine as a compressor to dissipate lower amounts of energy over a longer amount of time, as opposed to normal vehicle brakes that dissipate a large amount of energy for a shorter amount of time.

The base geometry block 160 serves as a feedforward feature for VGT control to improve transient response and also enable open loop control when desired as described further below.

The EGR command signal is received by lead compensation logic 140 to determine a lead compensated signal based on the EGR command signal. In embodiments of the present invention, this portion of the control loop synchronizes simultaneous EGR valve and VGT geometry control. Particularly, when EGR valve control alone is not sufficient to achieve desired EGR rate, the VGT geometry is modified to increase air flow through the turbine until the desired EGR flow is achieved. The lead term 140 improves transient response to compensate for the turbo boost lag. That is, when EGR valve control and VGT geometry control are not sufficient to achieve desired carbon dioxide content in the engine intake, increased flow through the turbine increases the overall air flow, but the turbine becomes less efficient, increasing the back pressure that drives carbon dioxide containing exhaust gasses through the recirculation path, resulting in increased carbon dioxide mass per cycle at the intake.

At block 142, an additional compensation term based on EGR valve position modifies the lead compensator output. As shown, summer 144 receives a desired air per cycle signal and an actual air per cycle signal to determine an air error. Lead compensator 140 and additional compensator 142 anticipate and exaggerate the air error when it is expected that the EGR valve is opening. The air error determined at block 144 and/or the base geometry (for example vane position) as determined at block 160 are used to determine the VGT command signal.

Preferably, at block 148, normalization values linearize the loop gain of PID controller 150, and serve as a variable switch between open and closed loop control approaches. That is, at low air flow conditions (low engine speed and low torque demand), the normalization factor reduces the air error to zero or to a sufficiently low value so as to be effectively insignificant in controlling VGT 174. That is, at low air flow conditions, normalization effectively eliminates the air error signal leaving the base geometry (the feedforward term) to control the VGT in an open loop fashion. On the other hand, once air flow reaches a sufficient level, the gain normalization factor jumps from zero to a sufficiently great value to control VGT 174 and linearize PID controller 150. As air flow continues to increase, the normalization factor decreases because at higher air flows, PID controller 150 is more effective. The gain normalization term is zero at low air flows. Air flow is preferably determined as a function of torque demand and engine speed. Once significant air flow exists, the gain normalization term is significantly increased to change from effectively pure open loop control of the VGT with the feedforward term to closed loop control of the VGT (with the feedforward term). As air flow continues to increase, the gain normalization term is reduced.

As shown by summer 152, the base vane position (or other suitable geometry indicator depending on the implementation) from block 160 provides the general control of the VGT command signal, while the signal derived from the air error provides fine tuning (except at low air flow conditions where the air error portion is effectively ignored and open loop control used). Coming out of the summer 152, limiter 170 limits the VGT command signal as needed to prevent turbo overspeeding. For example, at higher altitudes, continued demands for more oxygen may result in a turbo overspeed. This situation is prevented by turbo speed limit at block 172. After limiting, if necessary, the VGT command signal is applied to VGT 174. As explained above, the EGR command signal is utilized (with lead compensation) to adjust an air error signal to provide fine tuning of the VGT command signal. As such, continuous, simultaneous control of both the EGR and VGT systems allow the effects of these systems on each other to be taken into account during the control strategy. Lead term 140 improves transient response. Accordingly, the control loop also works in the opposite direction, adjusting the EGR valve position if a desired boost (or air/fuel ratio) is not achieved. That means, at tables 94,96, at lower oxygen per fuel, the value in the minimum $CO_2$ table commands a desired carbon dioxide quantity of zero. The upper $CO_2$ table is desired $CO_2$ quantity at an upper oxygen per fuel ratio. The lower $CO_2$ defines a lower oxygen per fuel ratio at which desired $CO_2$ is zero. That is, when the engine is already running fuel rich, tables 94 and 96 are interpolated such that desired carbon dioxide quantity is zero. As such, the function used to interpolate between the two carbon dioxide tables may be significantly different than the function used to interpolate between the two air quantity tables. Further, it is appreciated that the interpolation between any two tables is not limited to linear interpolation, but may take other forms.

Referring now to FIG. 3, a flow chart illustrating a method for reducing and/or eliminating visible exhaust smoke during transient engine operation is shown, in accordance with the present invention. The method is initiated at block 200. At block 202, engine speed is sensed. Engine load is then determined, as represented by block 204. At block 206, the engine controller determines whether the EGR circuit is operating. If EGR is flowing, the current EGR boost pressure is sensed, as represented at block 208. However, if EGR is not flowing the method resets, as indicated by blocks 206 and 200. At block 210, a minimum EGR boost pressure threshold value is determined. Preferably, the minimum boost pressure is derived by referring to a look-up table which is stored in the controller's memory. The look-up table contains a plurality minimum boost pressures for a given engine load and speed.

With continuing reference to FIG. 3, at block 212, the engine controller determines whether the current EGR boost pressure is below the EGR boost pressure threshold value. If the current EGR boost pressure is not below the minimum EGR boost pressure threshold, then the method resets, as indicated by blocks 212 and 200. However, if the current EGR boost pressure is below the minimum EGR boost pressure threshold value, the EGR valve is prevented from opening, as represented by blocks 212 and 214. Thus, the present invention provides increased control of the EGR circuit during transient engine conditions to eliminate discernable engine exhaust smoke.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for controlling an internal combustion engine having an exhaust gas recirculation (EGR) circuit including an EGR valve for diverting exhaust gas from an engine exhaust to an engine intake and a variable geometry turbocharger (VGT) circuit, the method comprising:

determining an EGR valve position signal;

ascertaining a predefined threshold based on at least one engine operating condition;

determining an EGR limit signal based on the predefined threshold;

applying the EGR limit signal to the EGR valve position signal for determining an EGR command signal for positioning the EGR valve, wherein the EGR limit signal restricts the EGR command signal for preventing the EGR valve from opening if the at least one engine operating condition is below the predefined threshold; and determining a VGT control signal based on a desired air per cycle and further based in part on the EGR command signal so as to allow cooperative EGR and VGT control based on the desired air per cycle while restricting the EGR command signal during specific actual transient conditions that cause the at least one engine operating condition to fall below the predefined threshold.

2. The method of claim 1 wherein the at least one operating condition is current EGR boost pressure.

3. The method of claim 2 wherein the predefined threshold is a minimum EGR boost pressure for a given engine speed and engine load.

4. The method of claim 1 wherein ascertaining the predefined threshold based on at least one engine operating condition further comprises accessing a look-up table having predefined thresholds stored therein.

5. The method of claim 1 further comprising determining whether EGR gas is flowing.

6. The method of claim 1 further comprising sensing a current engine speed.

7. The method of claim 1 further comprising determining a current engine load.

8. A computer readable storage medium having instructions stored thereon that are executable by a controller to control an internal combustion engine, the engine including a variable geometry turbocharger (VGT) and an exhaust gas recirculation (EGR) system, wherein the EGR system includes an EGR valve, the medium comprising:

instructions for determining an EGR valve position signal;

instructions for ascertaining a predefined threshold based on at least one engine operating condition;

instructions for determining an EGR limit signal based on the predefined threshold;

instructions for applying the EGR limit signal to the EGR valve position signal for determining an EGR command signal for positioning the EGR valve, wherein the EGR limit signal restricts the EGR command signal for preventing the EGR valve from opening if the at least one engine operating condition is below the predefined threshold; and instructions for determining a VGT control signal based on a desired air per cycle and further based in part on the EGR command signal so as to allow cooperative EGR and VGT control based on the desired air per cycle while restricting the EGR command signal during specific actual transient conditions that cause the at least one engine operating condition to fall below the predefined threshold.

9. The medium of claim 8 wherein the at least one operating condition is a current EGR boost pressure.

10. The medium of claim 9 wherein the predefined threshold is a minimum EGR boost pressure for a given engine speed and engine load.

11. The medium of claim 8 wherein instructions for ascertaining the predefined threshold based on at least one engine operating condition further comprises instructions for accessing a look-up table having the predefined thresholds stored therein.

12. The medium of claim 8 further comprising instructions for determining whether EGR gas is flowing.

13. The medium of claim 8 further comprising instructions for sensing a current engine speed.

14. The medium of claim 8 further comprising instructions for determining a current engine load.

15. A method for controlling an internal combustion engine having an exhaust gas recirculation (EGR) circuit including an EGR valve for diverting exhaust gas from an engine exhaust to an engine intake and a variable geometry turbocharger (VGT) circuit, the method comprising:

determining whether EGR is flowing;

determining an EGR valve position signal;

sensing a current engine speed;

determining a current engine load;

sensing a current EGR boost pressure;

ascertaining an EGR boost pressure threshold based on the current engine speed and the current engine load;

determining an EGR limit signal based on the EGR boost pressure threshold;

applying the EGR limit signal to the EGR valve position signal for determining an EGR command signal for positioning the EGR valve, wherein the EGR limit signal restricts the EGR command signal for preventing the EGR valve from opening if the current EGR boost pressure is below the EGR boost pressure threshold; and determining a VGT control signal based on a desired air per cycle and further based in part on the EGR command signal so as to allow cooperative EGR and VGT control based on the desired air per cycle while restricting the EGR command signal during specific actual transient conditions that cause the at least one engine operating condition to fall below the predefined threshold.

16. The method of claim 15 wherein the EGR boost pressure threshold further comprises a hysteresis value.

17. The method of claim 16 wherein the EGR limit signal restricts the EGR command signal for preventing the EGR valve from opening if the current EGR boost pressure is below the EGR boost pressure including the hysteresis value.

18. The method of claim 15 wherein the EGR boost pressure threshold is a function of engine speed and engine load.

19. The method of claim 15 wherein ascertaining an EGR boost pressure threshold further comprises accessing a look-up table having predefined EGR boost pressure thresholds stored therein.

20. A computer readable storage medium having instructions stored thereon that are executable by a controller to perform a method of controlling an internal combustion engine, the engine including a variable geometry turbocharger (VGT) and an exhaust gas recirculation (EGR) system, wherein the EGR system includes an EGR valve, the medium comprising:

instructions for determining whether EGR is flowing;

instructions for determining an EGR valve position signal;

instructions for determining current engine load;

instructions for determining current engine speed;

instructions for sensing current EGR boost pressure;

instructions for ascertaining an EGR boost pressure threshold based on the current engine speed and current engine load;

instructions for determining an EGR limit signal based on the predefined threshold;

instructions for applying the EGR limit signal to the EGR valve position signal for determining an EGR command signal for positioning the EGR valve, wherein the EGR limit signal restricts the EGR command signal for preventing the EGR valve from opening if the current EGR boost pressure is below the EGR boost pressure threshold; and instructions for determining a VGT control signal based on a desired air per cycle and further based in part on the EGR command signal so as to allow cooperative EGR and VGT control based on the desired air per cycle while restricting the EGR command signal during specific actual transient conditions that cause the at least one engine operating condition to fall below the predefined threshold.

21. The medium of claim 20 wherein the EGR boost pressure threshold further comprises a hysteresis value.

22. The medium of claim 21 wherein the EGR limit signal restricts the EGR command signal for preventing the EGR valve from opening if the current EGR boost pressure is below the EGR boost pressure including the hysteresis value.

23. The medium of claim 20 wherein the instructions for ascertaining a EGR boost pressure threshold further comprises instructions for accessing a look-up table having predefined EGR boost pressure thresholds stored therein.

* * * * *